Jan. 6, 1953     E. H. IVEY, JR., ET AL     2,624,695
TRANSFER OF GRANULAR MATERIALS
Filed July 28, 1950     2 SHEETS—SHEET 1
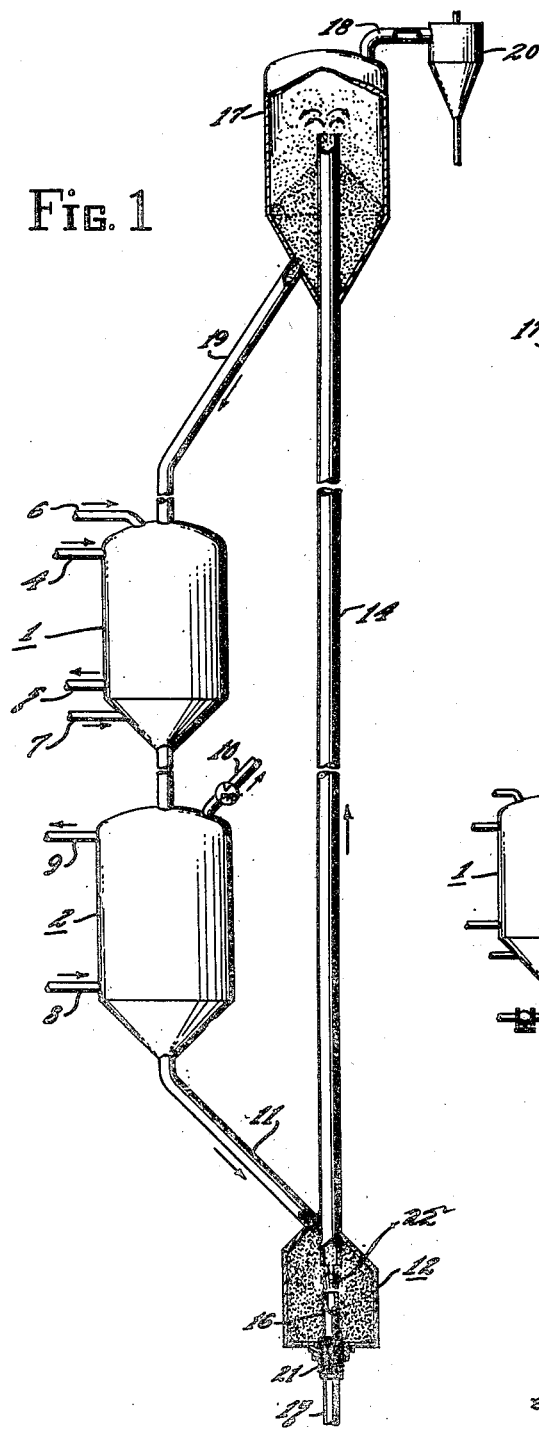
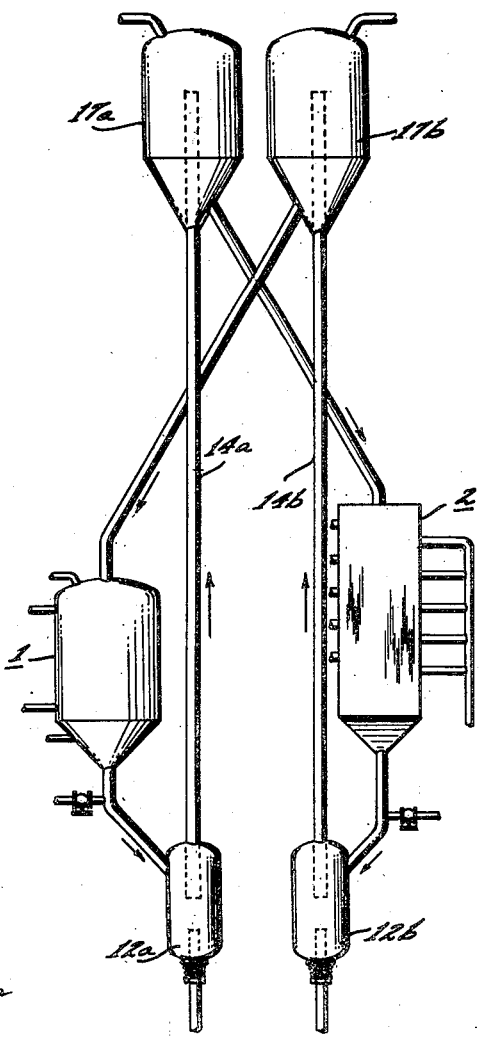
Inventors
Edwin H. Ivey, Jr. &
John W. Delaplaine
Gordon A. Kessler
Attorney Jan. 6, 1953    E. H. IVEY, JR., ET AL    2,624,695
TRANSFER OF GRANULAR MATERIALS
Filed July 28, 1950    2 SHEETS—SHEET 2
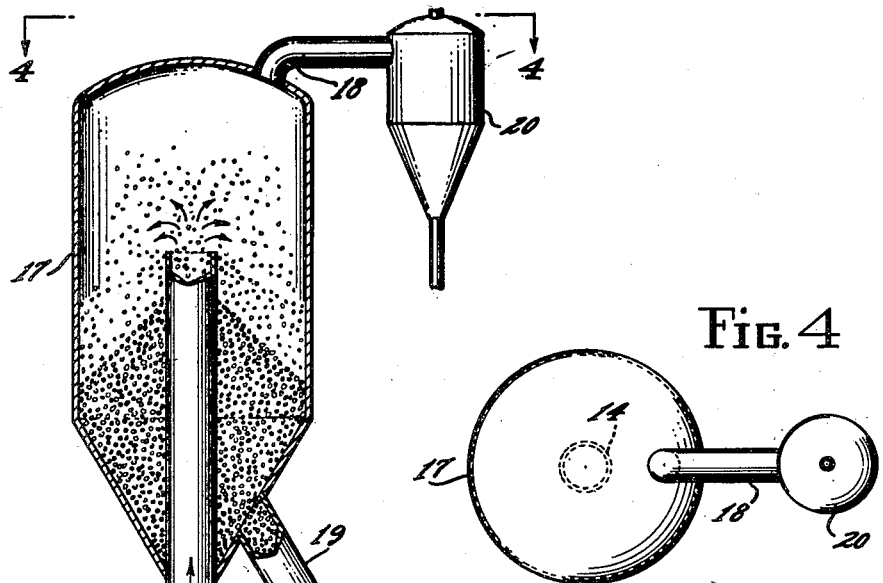
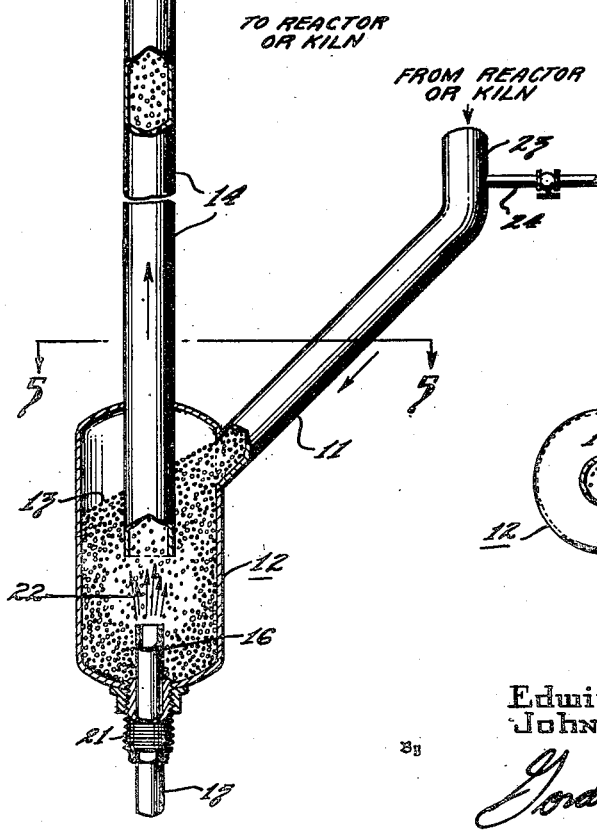
Inventors
Edwin H. Ivey, Jr. &
John W. Delaplaine
Gordon A. Kessler
Attorney Patented Jan. 6, 1953

2,624,695

UNITED STATES PATENT OFFICE 2,624,695

TRANSFER OF GRANULAR MATERIALS

Edwin H. Ivey, Jr., Glenolden, and John W. Delaplaine, Swarthmore, Pa., assignors to Houdry Process Corporation, Wilmington, Del., a corporation of Delaware Application July 28, 1950, Serial No. 176,420

2 Claims. (Cl. 196—52)

The present invention relates to an improved method and means for transfer and circulation of solid granular materials of discrete particle size. The novel features of the invention are especially important in connection with hydrocarbon conversion systems, and particularly in such systems wherein solid granular catalyst of comparatively large particle size is moved in continuous cycle between a reaction zone and a regeneration zone.

The invention may be advantageously applied in various hydrocarbon conversion processes utilizing such solid granular catalyst, such as in cracking, dehydrogenation, aromatization, reforming, and the like. In these and similar hydrocarbon conversion processes the catalyst, as a result of the reactions taking place during contact with hydrocarbon charge, accumulates thereon a carbonaceous or hydrocarbonaceous contaminant called "coke," formed as a by-product of such reactions, resulting in lowering the activity of the catalyst. Accordingly, it is the practice periodically to subject the used catalyst to regeneration by combustion of the coke deposited, in air or other oxygen-containing gas.

In systems wherein the catalyst is employed as a fixed bed, regeneration is accomplished by diverting the flow of hydrocarbons from said bed after a predetermined period of operation, and contacting the bed with the regenerating gas. In other known systems the catalyst is transported from the zone or reactor in which the hydrocarbon conversion operation takes place to a separate regenerator kiln or regeneration zone wherein combustion of the coke is carried out, and the regenerated catalyst is ultimately returned for use in the principal reaction. The present invention is concerned with the latter type of operation employing moving catalyst.

Several methods are now in use in the industry for carrying out the transfer of catalyst in its cycle of movement between reaction and regeneration zones. Since, during the course of the cycle of operations, catalyst usually has to be transported from a lower to a higher level, some means for effecting such elevation must be provided. In certain known and widely used installations mechanical conveyors, such as bucket elevators, are employed; while in other systems, such as those employing very finely diveded or powdered catalyst, the material can be readily "fluidized" by relatively homogeneous dispersion in a gaseous carrier, and is handled in such "fluidized" conditions. "Fluidization" refers to the characteristic exhibited by finely divided solids, which when suspended in a gas stream flowing upwards at relatively low velocity form a continuous turbulent bed at a relatively well-defined level, resembling a boiling liquid and having flow properties similar to ordinary liquids. Course granules have not been successfully fluidized in this manner. It has been proposed to employ pneumatic type means in the lifting and transporting in bulk of catalyst of larger particle size such as granules or pellets, but successful commercial operation of these proposals has not been heretofore achieved, because of the inherent difficulties in handling these larger size materials by known and attempted methods, and also because of the resulting erosion of equipment and/or high losses of catalyst due to attrition.

The reasons that methods devised and adopted for handling more finely divided or powdered solid materials are not directly applicable to comparatively large size granules involve not merely the matter of difference in size itself, but are occasioned by certain fundamental differences in the properties and behavior of the two materials in the presence of flowing gases. These differences stem from differences in dynamics of individual particles as a function of size as well as differences in behavior of the bulk mass of such particles. For an appreciation of the present invention some of the attributes of such fluidsolid systems are herein noted and contrasted.

The dynamics of systems composed of particles of solid material and a fluid have been more extensively investigated in recent years and certain properties of such systems are now appreciated; and although important observations have been made, these have not been fully and satisfactorily correlated and explained. It can be shown by formal mathematics and it has been demonstrated experimentally that particle behavior is decidedly influenced by the mean free path provided in the fluid medium, which is to a major extent determined by the particle size and concentration of the solid material. Thus, it has been demonstrated that with gas-solid systems comprising particles of fine size and particularly when these are of diverse size distribution, smooth fluidization can be obtained by controlled admission of gas thereto at comparatively low velocities; whereas in the case of larger particles as of the order of about 60 mesh or greater, the gas readily passes through a bed at these velocities without materially disturbing the particles in the bed, and as the velocity of the gas is increased beyond that at which the bed remains fixed, instead of dispersion of the particles in the gas there is obtained only an erratic breaking of continuity and bouncing of separated portions of the bed moving in spurts, referred to as "slugging."

It is well recognized that on reduction of the linear dimensions of a particle there is a considerable increase in interface, the total surface of the obtained sub-divided mass increasing approximately in the same ratio in which the linear dimension of the original particle is reduced. As the degree of subdivision produces particles of a size reaching or approaching colloidal dimensions, such increase in surface per unit mass (specific surface) brings into prominence certain energy influences, of which surfaces are the seat, which significantly affect the behavior of a body of such particles as a bulk mass or suspension thereof in a fluid. It now appears that at degrees of subdivision considerably less than colloidal, these properties of materials originating from high specific surface may demonstrate important influences. There is ample supporting evidence that certain residual forces between particles present in systems of the type which are not subject to smooth fluidization, are distinguishably absent in systems which can be smoothly fluidized.

The difference in behavior of solid particles of different order of magnitude can be theoretically appreciated from other considerations and otherwise simply demonstrated. For a solid material of given composition, according to Stokes' Law, with the other factors being constant, the terminal or maximum velocity attained by a particle freely falling in a quiescent fluid will vary with the square of the radius of the particles. This maximum or terminal velocity represents the velocity of the gas necessary to support a single particle of the solid without permitting falling or lifting, and corresponds to the "particle supporting velocity." Although it is not asserted that the values calculated from Stokes' formula are quantitatively representative for solid-fluid systems of the type under consideration, it will readily be seen as an approximate qualitative measure that a tenfold difference in size involves a difference in supporting velocity in the order of a hundredfold; and differences of this order have been observed. As the particles are further and further subdivided ranges are reached at which the inter-particle spaces are comparatively minute so that gas is entrapped and can only move through the bulk mass by displacing the particles. This, in large measure, may account for the comparatively long settling time of finely divided particles in bulk to reach a stable bed level. In the case of particles of substantial and discrete size, as of the order of 1 mm. and above, no appreciable time is involved in settling of the bed. Because of these fundamental properties characteristic of powdered and finely divided solid materials, the same can be readily fluidized at moderate gas velocities and when so fluidized the obtained dispersions can be handled as ordinary liquids with respect to their flow characteristics. On the other hand, even if perhaps theoretically not impossible conversion of comparatively large size particles to fluidized state to enable the handling thereof as fluids cannot be practically accomplished by known methods, and such larger sized particles can not be handled by methods devised for handling of more finely divided materials.

Among the important purposes of the present invention, accordingly, is the provision of an efficient means and method of handling such solid granular materials of comparatively large particle size in non-fluidized conditions. The invention is chiefly concerned with elevation by a gaseous medium of such granular materials employed as catalyst or other contact material in hydrocarbon conversion processes. By the novel features of the invention, granular catalyst of discrete particle size, as hereinbefore defined, is efficiently elevated by gaseous transporting fluids in a smooth operation under desired uniform flow conditions, while permitting comparatively high flow rates of the catalyst. This is accomplished, moreover, without accompanying high rates of catalyst attrition and with minimum erosion of equipment.

The solid materials with which the invention is concerned are those having an average particle size in the order of 14 mesh and larger, and including coarse granules of such size as well as the typical commercial beads and molded pellets of 2 to 5 mm. size and above. The mass of particles, for most efficient operation, should be of fairly uniform particle size. From practical considerations exact uniformity is difficult to maintain and a minor deviation may be tolerated, such that at least about 80 percent of the particles lie within ±20 percent of mean particle size. The term "substantially uniform particle size" as hereinafter employed is to be construed accordingly. The invention furthermore is directed to handling materials that are fairly dense; having an apparent bulk density of at least 20 pounds per cubic foot under random packed conditions. Particles of the indicated size range and density are further distinguished by the property of flowing freely in bulk non-fluidized state as when discharged from a bin or hopper, in contrast to light or more finely divided and powdered materials which, particularly when of wide size range, tend to agglomerate and pack and do not flow freely unless converted to fluidized condition and are handled as flowing liquids.

The inherent difficulties involved in handling and pneumatically transporting relatively heavy solid materials of large particle size as of the order above named, are overcome in accordance with the present invention by the particular manner provided for effecting engagement of such solid materials with a gaseous lifting and transporting vehicle and by control and correlation of conditions under which the pneumatic elevation thereof is brought about, including particularly the velocity of the transporting gas stream, the concentration of the solid material in the stream and the pressures throughout the system. These factors must be maintained within a well-defined range as will be hereinafter more explicitly set forth. Under the controlled and correlated conditions of the invention the mass of particles is elevated and caused to move smoothly as a relatively concentrated stream in substantially straight line flow, free from substantial eddying and turbulence of the particles.

In accordance with one aspect of the invention as applied to the elevation of catalyst or other contact material the pressure drop developed in the elevation of the material is coordinated with that prevailing in passing the material through the remaining portion of the system wherein the solid material moves or is moved through either or both a reaction zone and a regeneration zone as a dense compact non-turbulent bed. In the preferred embodiment, except for elevation of the solid material by the gaseous stream, the flow thereof elsewhere in its cycle of movement is effected by gravity.

A particularly important advantage of the invention in its application to catalytic hydrocarbon conversion processes enures from the relatively high mass circulation rates of catalyst that can be used therein, thereby enabling the efficient and economic operation of these processes at desired high catalyst-to-oil ratios.

The operation of the novel features of the invention and other advantages thereof will be understood from the description which follows, read in connection with the accompanying drawings illustrating a practical embodiment thereof, as applied to a catalytic hydrocarbon conversion system.

In the accompanying drawing, Figure 1 is a diagrammatic view in elevation of one form of arrangement of a system embodying the invention (portions being broken away and shown in section); Figure 2 is a schematic flow diagram of a modified arrangement; Figures 3–5 are enlarged views of the lift section shown in Figure 2.

In the arrangement illustrated in Figure 1, a reactor 1 is superimposed above a kiln 2, permitting unimpeded flow of catalyst therebetween through a connection conduit 3. The catalyst in the reactor 1 as well as in the kiln 2 moves downwardly by gravity as a solid compact bed. In the conventional operation, the bed of catalyst in the reactor 1 is contacted with hydrocarbons to be cracked or otherwise converted by passing such hydrocarbons through the reactor in concurrent or countercurrent relation to the downwardly moving bed of catalyst. In the illustrated embodiment of Figure 1, the hydrocarbons in vaporized state, for instance, are admitted by a line 4 and the vaporous conversion products are discharged from the reactor by means of a line 5 communicating in known manner with condensation and distillation equipment (not shown). Processing steam or seal gas may be admitted to the upper level of the reactor by a line 6. Below the vapor discharge level in the reactor 1, means are provided for purging the descending catalyst of adhering vaporous products, as by admission of a purge gas such as steam or inert gas through the line 7.

The thus purged catalyst discharged from the reactor 1 passes by gravity through conduit 3 into the kiln 2, wherein it is contacted with an oxygen-containing gas to regenerate the catalyst by combustion of the coke formed therein during use of the catalyst in the preceding hydrocarbon conversion reaction conducted in the reactor 1. In the kiln, the fresh oxygen containing gas may be admitted and combustion products removed at several levels, thus furnishing a multiplicity of regeneration stages, cooling means being provided to prevent excessive temperatures in the kiln. Other types of kilns may be substituted. In the illustrated kiln a single zone of admission of regenerating gas is shown entering through line 8; flue gas being withdrawn through line 9. Above the combustion zone in the kiln a vent is provided, controlled by an automatic pressure release valve 10, maintaining a pressure at that level somewhat above the present at the flue gas outlet 9, to further safeguard against the entry of such gas into the conduit 3.

The regenerated catalyst discharged from the kiln 2 flows by gravity through a conduit 11 to a transfer chamber 12, forming a confined bed therein, the catalyst filling the vessel, or assuming a normal angle of repose as particularly illustrated at 13 (Figure 3). Extending from below the top level of the bed of catalyst in the transfer chamber 12 there is shown a lift pipe 14 into which catalyst from the bed in the chamber is impelled by means of a gas stream directed through the bed as by the line 15 and nozzle 16.

The discharge terminal of the lift is at a height above the reactor 1. Thus, as shown, lift pipe 14 discharges into a disengaging chamber 17 the lift gas being separated through an overhead line as indicated at 18, while the solid catalyst material released from the influence of the lift gas falls by gravity to form a bed supported by the bottom of the disengaging chamber 17. From such bed catalyst is returned to the top of reactor 1, flowing by gravity thereto through a conduit 19 which also operates as a seal leg. Means are provided for separation of fines from the disengaged gas as in the form of a cyclone separator represented at 20 communicating with the overhead discharge line 18. The flow of hydrocarbon vapors from reactor 1 into the conduit 19 is prevented by the introduction of a seal gas into the conduit, preferably steam, entering the top of the reactor through line 6.

Instead of the reactor being placed above the kiln as illustrated in Figure 1, the order may be reversed. Also, the reactor and kiln may be located one beside the other with the provision of separate pneumatic elevators for lifting the catalyst to supply zones above the tops of the reactor and kiln respectively. A flow diagram of the latter arrangement is illustrated in Figure 2. The direction of the catalyst flow is shown by the arrows. The catalyst discharged from the reactor 1 is passed into transfer chamber 12a from which it is impelled into lift pipe 14a to a disengaging chamber 17a. The catalyst then flows by gravity to and through the kiln 2 and the regenerated catalyst is discharged into a similar transfer chamber 12b, from which it is transported through lift pipe 14b to disengaging chamber 17b, and discharged therefrom for return by gravity to the top of reactor 1.

Coming now more particularly to the description of the transporting section shown in enlarged scale in Figures 3–5. The particular arrangement illustrated may be employed with any type arrangement whether the reactor and kiln are superimposed in either order or placed side by side. As has been previously pointed out the mouth of the lift extends below the top level of the bed of catalyst in the transfer chamber 12. This is important to assure desired high catalyst flow rates with minimum gas expenditure and the maintenance of substantially straight line flow of catalyst through the lift pipe 14. The transfer chamber 12 may be of any desired configuration but should be of sufficient lateral cross-section to permit the necessary flow of catalyst from the conduit 11 into the transfer chamber 12, by providing ample space between the periphery of the lift pipe 14 and the wall of the chamber.

The nozzle 16 is mounted in a threaded member 21 whereby the nozzle may be raised or lowered, thereby controlling the gap provided at 22 between the mouth of lift pipe 14 and the outlet of the nozzle 16. Such adjustment of the gap provides a means for controlling the rate of circulation of catalyst through the system. It will be seen that the rate of withdrawal of catalyst from the processing vessel, be it the reactor or kiln, through the conduit 11 will depend upon the rate at which catalyst is directed into the lift by the nozzle 16. Withdrawal of catalyst from the bed in the chamber 12 permits further flow thereto, thereby controlling the rate of movement of the catalyst higher up in the system; no throttling valves or other restrictions being placed in the several conduits 19, 3 and 11. It is necessary, of course, that the supply of catalyst available for passage through conduit 11 be at least equal to and preferably exceed that demanded by the rate at which catalyst is withdrawn from the bed by the gas stream, and that the conduit 11 be of sufficient diameter to supply that demand, so that unimpeded or "flooded" flow to the hopper is had, and control of the rate of circulation of the catalyst lies at the lift inlet.

In order to maintain unimpeded flow of catalyst through the conduit 11 the pressure in such conduit should be controlled so as to prevent upward flow of gas therein in quantity sufficient to materially impede the passage of catalyst therethrough. This may be accomplished, for instance, by the provision of a seal leg in communication with the conduit 11 as illustrated at 23, into which a seal gas is admitted at regulated rate through a valve controlled line 24, thereby maintaining the pressure in the conduit 11 approximately equal to or slightly above that existing in chamber 12. There being no substantial pressure differential between the outlet of nozzle 13 and the outlet of conduit 11, all of the gas introduced by means of nozzle 16 will be directed up the lift pipe carrying along therewith catalyst entering into the path thereof in the gap between the nozzle and the mouth of the lift pipe. It should be noted that the relation of the nozzle to the lift is such as to provide a positive, directive, and impelling force as distinguished from arrangements depending chiefly on aspiration effective by differences in velocity head between points in the path of a moving stream of fluid.

The introduction of a seal gas into the seal leg 23 will not always be necessary, since the system can be so arranged that the pressure at the bottom of the processing vessel communicating with the transfer chamber 12 is equal to or slightly in excess of that existing in the chamber, in which event by-passing of lift gas from the chamber into the conduit would not take place. The arrangement illustrated in Figure 1 can be operated in this manner. For instance, if the pressure at the bottom of the kiln adjacent the regenerating gas inlet 3 is maintained say at about 9 pounds per square inch gauge and a pressure drop of about 1 pound per square inch is had between this point and the inlet to the lift, the conditions of operation can be controlled to produce a required pressure of about 8 pounds per square inch at the lift inlet. Operating the lift under conditions to produce a total pressure drop of 7 pounds in the lift pipe 14, the disengaging chamber 17 will then be at slightly above atmospheric pressure, say at about 1 pound per square inch gauge. The remainder of the system can be arranged to provide pressure balance. Thus, steam may be introduced through line 6 to maintain the pressure at that point at about 12 pounds per square inch, a portion of the steam flowing upwardly into the seal leg provided by conduit 19 into the disengaging vessel 17; the other portion of the steam flowing downwardly through the reactor 1. The hydrocarbon vapors may be introduced through line 4 under conditions to produce a pressure of 11 pounds per square inch and discharged through line 5 at a pressure of about 6 pounds. The purge gas introduced through line 7 may also operate as a seal gas and would therefore be introduced at a slightly higher pressure, say 6.5 pounds. The flue gas could be discharged from the kiln 2 through line 9 at 6 pounds per square inch, whereby the steam entering through line 7 would flow in both directions, being discharged in part with the hydrocarbon vapors through line 5 and in part through the pressure relief valve 10, which by being controlled to operate at a pressure of about 6.3 pounds would prevent admission of steam into the combustion zone of the kiln.

If the lift gas employed is not incompatible with the reaction carried out in the lowermost processing vessel communicating with the lift, the pressure at the lowermost processing vessel may be even slightly below that in the lift so that a small amount of lift gas advantageously flows upwardly through the conduit 11 to provide the required pressure balance. This quantity of gas must be maintained sufficiently low so as not to interfere with or substantially impede the continuous uninterrupted downward flow of catalyst through the conduit 11.

The lift pipe 14, as previously set forth, discharges into the disengaging chamber 17, wherein the lift gas is separated from the catalyst. The top closure of the disengaging chamber 17 must be located at a sufficient height above the discharge outlet of the pipe 14 such that the emerging fountain of catalyst is not forcibly impelled against said top, taking into consideration the reduction in velocity brought about by the difference in cross-section between the lift pipe 14 and the chamber 17. The catalyst separated from the lift gas in the chamber 17 falls downward to form a dense compact bed from which catalyst is removed by means of conduit 19, passing by gravity to the desired processing vessel, which may be the reactor or kiln.

The relative size of the various appurtenances of the lift system are of considerable importance in maintaining the desired high catalyst flow rates and smooth transportation of the catalyst free from "slugging" and eddying. For instance the required ample space between the periphery of the lift pipe and the side wall of the transfer chamber is assured when such space is of a width no less than equal to the diameter of the lift pipe. With the lift pipe located centrally of the chamber 12, as is preferred for uniformity of distribution, it will be seen that the lateral dimension of the chamber will be approximately no less than 3 times the diameter of the lift. As long as the required space is provided and an adequate bed depth maintained in the transfer chamber, the configuration of the chamber is relatively unimportant. The lift pipe must extend into the chamber 12 to a depth such that the catalyst bed therein is at least several inches above the mouth of the lift pipe.

With respect to the disengaging chamber 17, as an empirical rule, the lateral cross-section of this chamber should be somewhat larger than that of the transfer chamber. A disengaging chamber having the width of approximately 7 or 8 times the diameter of the lift pipe will ordinarily be ample, but for full flexibility of operation a disengaging chamber of at least about 10 times the lift diameter is preferred. The top of the disengaging chamber 17, moreover, must be at a height sufficiently above the outlet of the lift pipe to be out of reach of the discharge stream of catalyst, so as to avoid attrition of catalyst by impact with the top of the disengager; the particular height required will depend upon the velocity that the catalyst is discharged into the disengaging vessel and the diameter of the lift pipe.

The diameter of the lift pipe itself as well as the diameter of the gas nozzle 16 and the ratio therebetween, will be determined with relation to the quantity of catalyst to be circulated and the allowable pressure drop in the lift in connection with the details of the processing operation, as will be hereinafter more fully explained. In like manner, the length of the gap 22 must also be regulated or set accordingly, to provide the required high rate of catalyst circulation under the most favorable rates of gas supply to the lift from the standpoints of efficiency and economy of operation.

In designing a hydrocarbon conversion system, the number of different inter-related variables presented permits wide flexibility in selection of the construction and operation of the processing portion of the apparatus as well as in the component transfer and transporting means. In arriving at a particular construction and selecting conditions for the operation thereof, economic considerations cannot be overlooked. In order to simplify presentation of the various factors involved in accordance with the invention, for the purpose of discussion, consideration will be given more particularly to the factors entering into the design of the transporting system in connection with a hydrocarbon conversion unit of predetermined construction. With the processing portion of the system including reactor and regenerator design and operation already determined, certain limitations on the design and construction of the transporting portion will also be resolved. For instance, the minimum height of the elevator or lift pipe will be fairly fixed by the height of the processing portion of the system comprising the reactor and the regenerator and any supply hoppers thereto. Where the reactor and regenerator are superimposed, it will be seen, that for a unit of any given capacity this arrangement calls for a higher lift than in cases of side by side arrangement of the reactor and regenerator. The throughput rates of catalyst required for a given processing operation will also have an important bearing on the choice of dimensions and gas requirements of the pneumatic lift. Although the factor of pressure drop encountered through the reaction and regeneration portions of the system is not immediately controlling and permits considerable latitude for compensation or correlation outside of the lift and appurtenant equipment, the order of magnitude of such pressure drop does have an important influence on the relation between the transporting section and the processing section of the system that must be taken into account. For desired balanced operation, the existing pressure differentials may be taken care of in the design and selection of proper operating conditions in the lift, and/or in the feed and transfer lines connecting the several component parts of the processing apparatus, as well as in the transfer lines between the processing portion of the apparatus and the lift proper. Pressure drops in the processing portion of the system can also be varied for any given rate of hydrocarbon charge or regeneration gas requirement by choosing the relative direction of flow of such fluids through the reactor and regenerator respectively and the manner of admission of these fluids to these units. With the processing variables and arrangement of the reactor and regenerator fixed (but subject to correction as further correlation may require), certain factors which will enter into the design of the lift will thus be largely dictated thereby, including the approximate minimum lift height, required catalyst circulation rate, and the flexible factor of pressure drop. The catalyst circulation rate, it has been determined, is a direct function of average catalyst concentration in the lift and the average linear flow velocity of the catalyst in the lift; that is, catalyst flow rate in terms of pounds per second per square foot cross-section of lift is equal to the product of the average linear flow velocity of the catalyst in feet per second and the concentration thereof in pounds per cubic foot. It has been found, however, that velocity of catalyst in the lift is an important factor effecting the extent of catalyst attrition. Since the height of rise of the catalyst beyond the top of the lift into the disengaging vessel is influenced by the exit velocity, it will be seen that for increasing catalyst velocity the height of the disengager must be correspondingly increased to avoid impact of the catalyst with the top of the disengager, or complex arrangements must be resorted to for more rapidly decelerating the catalyst within the disengager. On the other hand, at low catalyst velocity desired streamline flow into and within the lift is difficult to attain. At linear velocities of the catalyst as low as 3 to 5 feet per second considerable slugging occurs even in small diameter pipes. In larger diameter pipes employed in commercial design, in the order of about one foot or more in diameter, velocities merely beyond the slugging range are insufficient; certain minimum velocities must be attained within the lift to assure continuous and uninterrupted upward movement of the catalyst without significant tendency for portions of the stream of catalyst to slow up or reflux along the lift path. Thus, it has been found with commercial cracking catalyst of about 3–4 mm. size transported upwardly through lift pipes of about one foot size, the catalyst should be permitted to attain a velocity within the lift of at least about 20 feet per second to achieve desired continuous and straight line flow obtaining low catalyst attrition. Above about 50 feet per second catalyst velocity, the height of the disengager required to avoid contact of catalyst with the top thereof may be impractical from structural considerations, and in addition such increase in height would not overcome the possibility of attrition due to impact upon fall of the catalyst from its attained height to the bottom of the disengager or to the catalyst bed therein. Under these conditions of high catalyst velocity above about 50 feet per second, certain measures for reducing the height of rise of catalyst within the disengaging vessel might be adopted (such as by gas withdrawal), but only at the expense of increased complexity of construction and operation. Within the stated practical range of catalyst velocity attained within the lift, the attrition rates are acceptably low and may require a makeup rate not greater than that which would otherwise be ordinarily employed for the purpose of maintaining equilibrium catalyst activity.

It has also been found that for efficient flow of catalyst in the lift at the desired low attrition rates, the concentration of the catalyst in the lift must be controlled so as to provide a stream of catalyst within the lift having an average concentration of not less than about 2 to 3% and up to no more than about 40% of the average density of the catalyst. Based on various commercial types of catalyst having apparent bulk density ranging from about 40 to about 55 pounds per cubic foot, the average concentration in the lift should be not less than about 1-2 pounds per cubic foot. Concentrations of up to 18-20 pounds per cubic feet constitute a practical top range although not necessarily the maximum limit of operability.

In determining the most desirable operating conditions for the lift, in addition to considerations to be given to catalyst velocity and catalyst concentration, the matter of pressure drop over the lift path also has an important bearing. That part of the energy supplied by the gas stream to effect upward movement of catalyst which is expended in the lift is distributed along the linear path travelled by the catalyst as represented by the pressure drop occurring at successive levels in the lift. It has also been found that when the conditions of operation are such that the pressure drop in the lift is too low, the quantity of lift gas required for moving a given mass of catalyst is greatly increased, with correspondingly lowered efficiency of operation. On the other hand excessively high pressure drop may result in surging or localized non-uniformity in flow conditions, in the form of areas of high and low concentration, which tend to increase either or both wall friction and inter-particle friction. It has been empirically found that satisfactory flow conditions obtain with efficient application of the lift gas to useful work when the pressure drop in a lift of about 150 to 200 feet in height is maintained at no lower than about 3 pounds per square inch. Stated otherwise, the average pressure gradient (total pressure drop divided by lift height) should be no lower than about 2 to 3 pounds per square foot of lift height. At an average pressure gradient above about 20 to 25 pounds per square foot per foot of lift height practical control difficulties are encountered and in addition to expected higher attrition of catalyst, efficient and smooth elevation of catalyst becomes increasingly more difficult.

The relation of the several factors above mentioned will be appreciated from the following examples showing the effect of varying conditions in a typical lift operation; (the data are based on a lift pipe of 12 inch diameter and 175 feet in height operating with air at room temperature in elevation of pelleted catalyst of about 50-55 lb./ft.³ bulk density and approximately 0.1 inch average diameter). The terms "bulk density" or "apparent bulk density" of catalyst or other granular material as herein employed have reference to the weight of a lightly packed column of a standard volume of such material expressed in pounds per cubic foot. Designations of gas velocity in the following table and elsewhere in the description have reference to "superficial velocity" as measured by flow of the gas in an empty pipe.

Table 1

| Mass Velocity Catalyst, lb/(sq. ft.) (sec.) | Gas velocity top of lift, ft./sec. | Max. Catalyst velocity, ft./sec. | Catalyst Concentration at top of lift, lb./cu. ft. | Total Pressure drop, lb./sq. in. |
|---|---|---|---|---|
| 93.8 | 58.8 | 25.0 | 3.76 | 7.0 |
| 56.0 | 69.1 | 34.4 | 1.63 | 3.0 |
| 94.8 | 69.1 | 35.4 | 2.08 | 5.0 |

As an example of a typical operation taking advantage of the above considerations, in a practical unit designed to circulate catalyst of the type indicated at the rate of about 200 tons an hour, at an operating temperature in the order of 900 to 1000° F., the diameter of the lift pipe, employing inexcessive quantities of lift gas, may range from about 14 to 20 inches, requiring lift gas supply at from about 2000 to 5000 standard cubic feet a minute. For instance, at an attained maximum catalyst velocity of about 50 feet per second in a 200 foot lift, to which lift gas in the form of air is supplied at the rate of 3000 standard cubic feet a minute, the total pressure drop will be approximately 5 pounds per square inch.

Considering on the other hand a smaller unit operating at the same indicated temperature and circulating 100 tons of catalyst per hour, there would be employed lift pipes having a diameter of from about 10 to 14 inches, these being approximately in the same cross-section ratio for capacity as the larger unit. For a 12 inch pipe at an attained maximum catalyst velocity of about 40 feet per second operating at a pressure drop of about 3.5 pounds per square inch, about 1500 standard cubic feet of gas per minute would be required calculated on the basis of air.

To maintain the desired flow rates for any given operating conditions, not only must there be an adequate and continuous supply of catalyst in the transfer chamber 12, but it is also important that a gap of at least minimum height be provided between the outlet of the lift gas discharge nozzle 16 and the inlet to lift pipe 14 to permit free and continuous flow of catalyst into the path of the gas stream at a rate sufficient to continuously replace that impelled by the gas stream.

The diameter of the gas nozzle may be equal to or smaller than that of the lift pipe and in some instances even somewhat larger. With wider nozzles approaching or exceeding the lift pipe diameter, however, greater variation in pressure drop results and a zone of high pressure drop is formed in the lower portion of the lift. Nozzles of very small diameter require increased gas velocities in the nozzle to supply the necessary amount of lift gas, with consequent wasteful dissipation of energy due to increased friction in the nozzle as well as from head losses on expansion in the chamber. Very small jets, moreover, may call for expensive high powered compressors with costly power requirements. From over-all considerations, gas inlet nozzles of from about ¼ lift pipe diameter to short of lift pipe diameter may be employed with the preferred size lying between about ⅓ to ⅔ the lift pipe diameter.

With the diameter of the gas inlet nozzle thus chosen with respect to the lift pipe diameter, the gap between the nozzle and the mouth of the lift pipe may be varied from the minimum over a considerable range. Examples of suitable arrangements are: a twelve inch diameter lift pipe with a 4 inch gas nozzle and a gap of 24 inches; a small lift unit may employ a lift pipe of three inch diameter with a three inch gas nozzle and a five or seven inch gap.

Although in discussing flow rates above, reference was had to the use of air as a basis of illustration, it will be understood that any gas (including in the term vapors, as well as gases carrying suspended liquid in which the gas constitutes the continuous phase) may be employed that does not have a deleterious effect on the solid material being transported. Thus, inert gas, or gases recovered from the processing units, such as flue gas or hydrocarbon gas, can be used. If the gaseous fluid employed is incompatible with the processing operation next following in the cycle of catalyst circulation, in addition to a separation of the lift gas in the disengaging chamber, provision should be made for purging the catalyst as well as sealing the processing unit against admission of the incompatible gas.

Obviously many modifications and variations of the invention as hereinbefore set forth may be made without departing from the spirit and scope thereof and therefore only such limitations should be imposed as are indicated in the appended claims. The present application is a continuation-in-part of application Serial No. 29,016, filed May 25, 1948, now abandoned.

We claim as our invention:

1. In the conversion of hydrocarbons with a solid granular contact mass of substantially uniform particle size of at least 14 mesh, the method of circulating said contact mass through a system including a hydrocarbon conversion zone, which comprises passing said contact mass continuously by unimpeded gravitational flow as a laterally confined uninterrupted compact column to a transfer zone to maintain a bed of such contact mass in said transfer zone at substantially constant top level, admitting lifting gas within said bed at a controlled rate and under pressure sufficient to effect lifting of contact mass from below the top level of said bed into a laterally confined passage having its inlet below said top level and having its discharge outlet at a considerable height above said bed, maintaining a constant supply of said contact mass externally of said transfer zone and in flow communication therewith through said column and maintaining said column at a size sufficient to assure continuous flow of contact mass to said transfer zone at a potential rate at least equal to the rate at which contact mass is removed from said transfer zone by said lifting gas, whereby the rate of circulation of the contact mass is always controlled by the rate of admission of said lifting gas into said bed; maintaining an inlet space below said laterally confined passage and in vertical alignment therewith of sufficient height to permit unimpeded movement of said contact mass into said space and into the path of said lifting gas in sufficient quantity to provide an average concentration of such contact mass in the gas stream during upward movement through said laterally confined passage of at least 1 to 2 pounds per cubic foot, said lifting gas being admitted to said bed at a rate at least sufficient to accelerate said contact mass within said confined passage to a linear velocity of 20 feet per second whereby such contact mass moves through said confined passage in essentially straight line flow free from slugging, refluxing, and substantial turbulence; and discharging the mixture of contact mass and lifting gas from said confined passage into an expanded disengaging zone, thereby effecting reduction in the velocity of the contact mass to an extent causing settling of the mass from the gas, and separately withdrawing the separated gas from said disengaging zone.

2. In a system for continuously circulating coarse granular material of discrete particle size from a treating zone and returning at least a major portion of the circulating material to said treating zone, the method which comprises continuously discharging such granular material from the bottom of said treating zone and conducting the discharged material downwardly as a laterally confined column to an accumulating zone maintained at superatmospheric pressure, maintaining a fluid pressure in said downwardly moving confined column at less than that in said accumulating zone thereby permitting a small portion of gas to flow from said accumulating zone upwardly through said column but insufficient to substantially impede downward flow of the granular material from said confined column into said accumulating zone, supporting and laterally confining such granular material in said accumulating zone to provide a continuously replenished bed thereof of substantial height, said bed being in continuous contact at the place of intersection therebetween with granular material in said downwardly moving column and forming therewith a continuous compact mass, so that removal of granular material from said bed causes flow of granular material in said column to replenish that removed from the bed; introducing upwardly through said bed a stream of gaseous fluid with sufficient force to impart an upward velocity to such granular material in the path of said stream and engaged thereby thus effecting removal of granular material from said bed, continuously flowing said fluid and engaged granular material upwardly as a mixed stream having an average concentration of at least 1-2 pounds per cubic foot, laterally confining the upwardly moving stream of fluid and granular material at a level below the top of the bed and through a desired height to a disengaging zone of extended width and at a level above the top of said treating zone, forming in said disengaging zone a compact non-turbulent bed of said granular material, discharging said mixed stream of fluid and solids above the upper level of said bed in said disengaging zone thereby causing separation of said granular material from said stream, withdrawing fluid so separated above said bed in said disengaging zone and discharging the granular material by gravity from the bed in said disengaging zone for return to said treating zone.

EDWIN H. IVEY, Jr.
JOHN W. DELAPLAINE.

REFERENCES CITED

The following references are of record in the file of this patent:

UNITED STATES PATENTS

| Number | Name | Date |
|---|---|---|
| 2,407,700 | Huff | Sept. 17, 1946 |
| 2,414,373 | Gerhold | Jan. 14, 1947 |
| 2,440,475 | Jacomini | Apr. 27, 1948 |
| 2,509,983 | Morrow | May 30, 1950 |